Patented June 4, 1929.

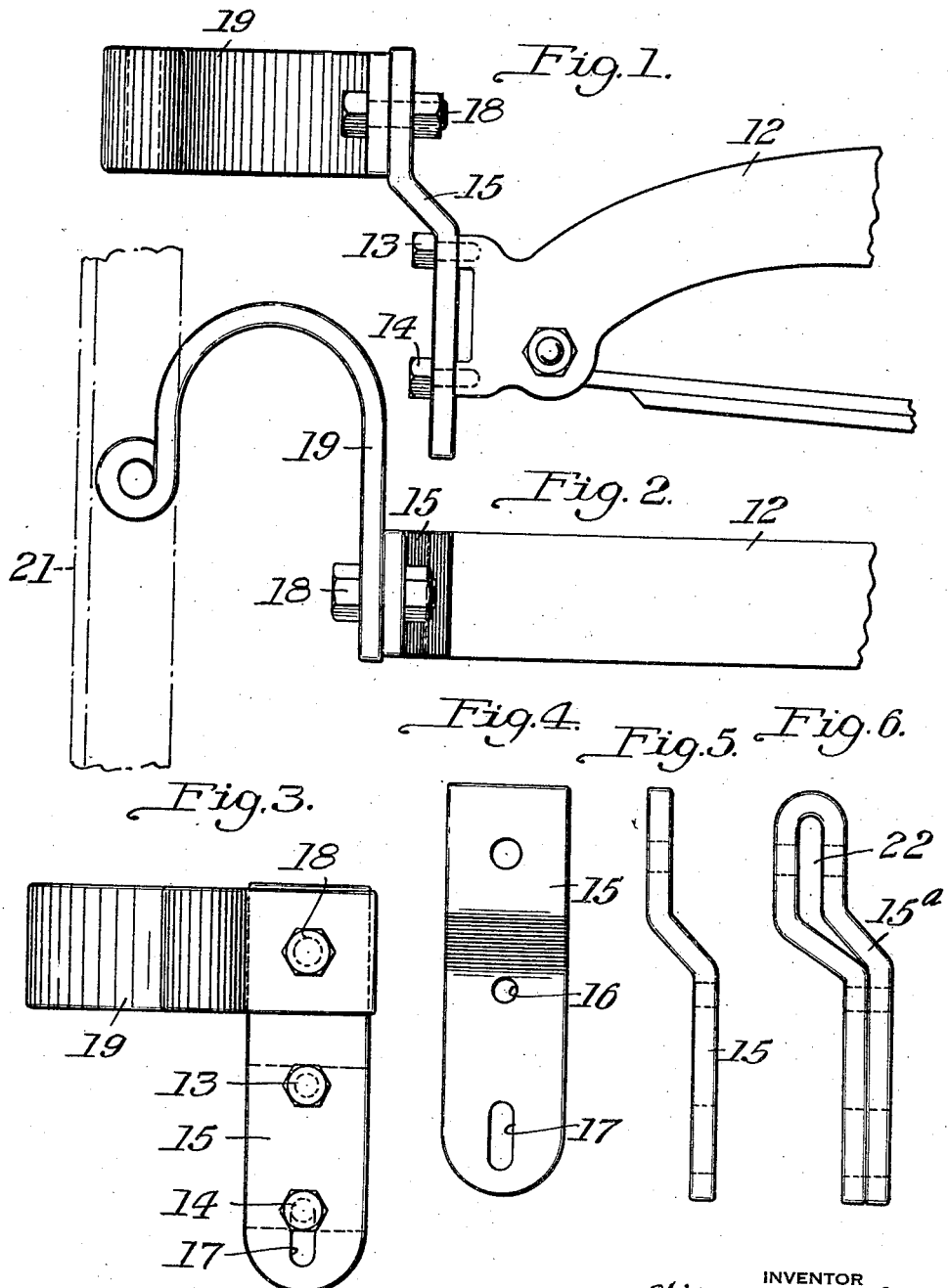

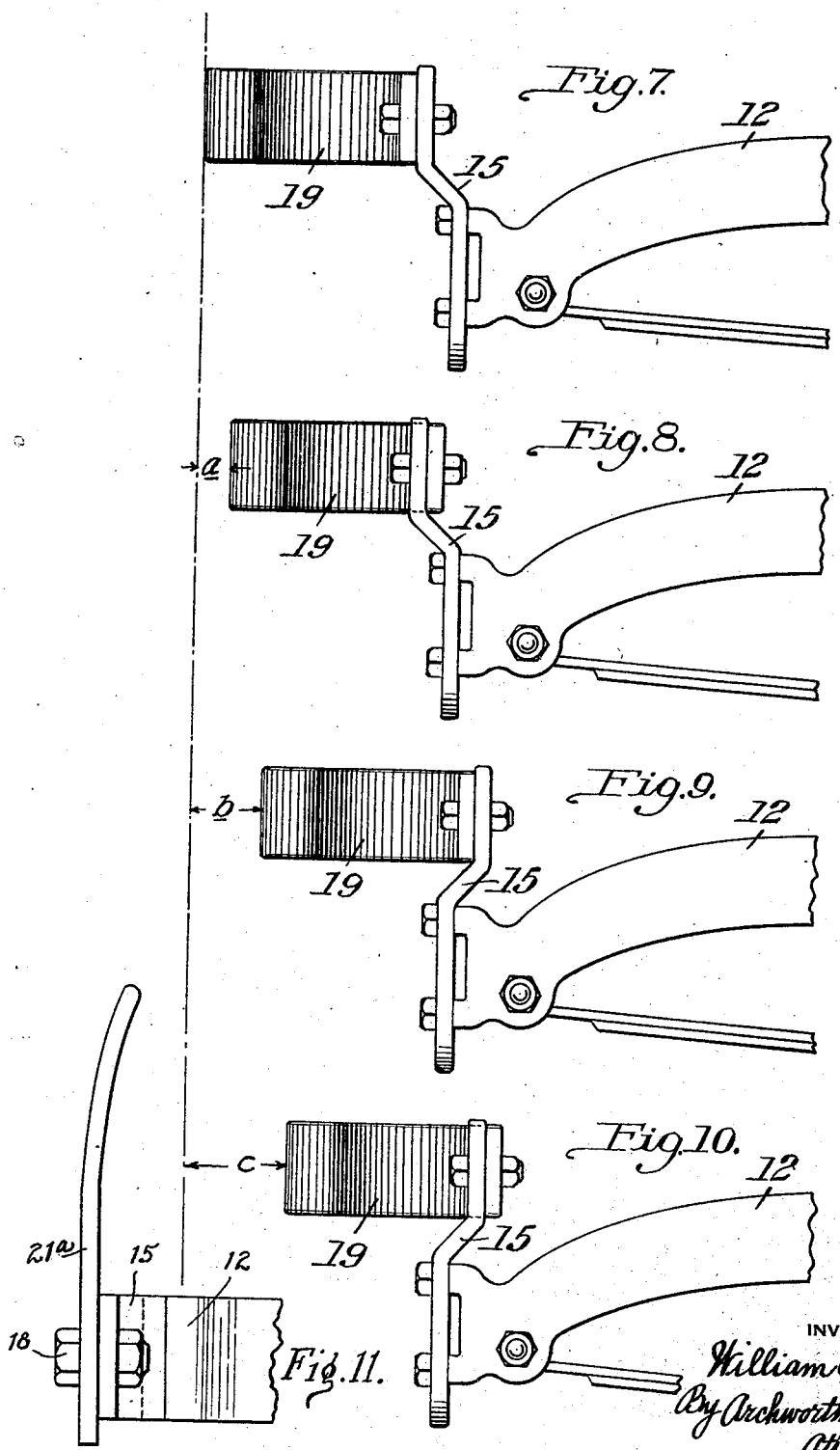

UNITED STATES PATENT OFFICE.

WILLIAM R. McGOWEN, OF McKEES ROCKS, PENNSYLVANIA, ASSIGNOR TO UNITED STATES CHAIN & FORGING COMPANY, OF PITTSBURGH, PENNSYLVANIA, A CORPORATION OF DELAWARE.

AUTOMOBILE BUMPER BRACKET.

Application filed January 24, 1928. Serial No. 249,141.

My invention relates to brackets for use in attaching bumper bars to vehicle frames, and more particularly to an improved means for attachment of bumper bars or their supporting arms to the ends or side frames of automobiles and the like, although the invention is capable of use in various other relations.

One object of my invention is to provide a bracket member or riser of such form that a bumper bar may be connected thereto at a plurality of horizontally-spaced points, particularly in a direction transversely of the bumper bar.

Another object of my invention is to provide a bracket member of such form that by turning it about one axis the distance between the bumper bar and the adjacent end of the vehicle frame can be varied.

Still another object of my invention is to simplify and improve generally connecting devices for the attachment of bumper structures, etc. to supporting members.

Some of the forms which my invention may take are shown in the accompanying drawing, wherein Figure 1 is a side elevational view showing my invention attached to the side of a vehicle frame; Fig. 2 is a plan view thereof; Fig. 3 is a front elevational view of the structure of Fig. 1; Fig. 4 is a front elevational view of the riser of Fig. 1; Fig. 5 is a side or edge elevational view thereof; Fig. 6 is a side or edge elevational view of a modified form of riser; Figs. 7, 8, 9 and 10 are views showing the manner in which various parts may be positioned to secure a desired spacing of the impact bar relative to the ends of vehicle frames, and Fig. 11 shows a modification of the structure of Figs. 1 and 2.

In the following description, I will refer to the bracket members as being connected to the front ends of vehicle frames, but it will be understood that similar attaching means may be provided also at the rear ends of such frames. Further, I show only one side frame member of a vehicle, it being understood that the attaching means will be provided for the other side frame member also, so that both ends of the impact bar may be properly supported, and it will also be understood that the brackets may be attached to supporting structures other than side frame members.

Referring to Figs. 1 to 5, I show a portion of a side frame member 12 having its forward end tapped for the reception of screws 13 and 14 by means of which a riser or bracket member 15 may be connected to the end of the frame. The bracket member 15 is provided with holes 16 and 17 for the screws 13 and 14, the holes 17 being of elongated or slot-like form so that the bracket member can be attached to frames whose screw holes are spaced at various distances apart.

A bolt 18 is provided for connecting a bar supporting arm 19 to the upper end of the riser 15. The arm serves as a support for one end of an impact-receiving or bumper bar 21. Where the nature of the bumper bar permits, it may be attached directly to the upper end of the riser, as shown in Fig. 11, instead of being connected thereto through the medium of arms, such as 19.

As shown in Figs. 7 and 8, the arm 19 may be bolted to either the front or rear face of the riser 15. In Figs. 9 and 10, the riser is shown as turned upon its longitudinal axis so that its upper end will project rearwardly instead of forwardly of the forward extremity of the vehicle frame. In these figures also, the arm 19 is shown as connected to the front and rear surfaces of the riser 15.

It will be seen that the form of the bracket 15 is such as to permit positioning of an impact bar at four different points forwardly of the vehicle frame by simply connecting the supporting arm 19 to the front or the rear surface of the risers as desired and by reversing the position of the riser 15 about its longitudinal axis with respect to the vehicle frame. Thus, in Fig. 8, the arm extends forwardly at $a$ a distance of say ¾ inch to one inch less than in Fig. 7, depending upon the thickness of the riser 15. In Fig. 9, the distance $b$ is greater than the distance $a$, and the arm may be say 1½ inches rearward of the arm 19 of Fig. 7, depending upon the amount of deflection at the mid portion of the bracket 15. The distance $c$ is greater than the distance $b$ an amount equal to twice the thickness of the riser 15. The extreme simplicity of the device will be apparent, since only the regular attaching bolts and holes are employed and no telescoping or slidably adjustable parts are required.

In Fig. 6, I show a riser 15ª that has the same general form as the riser 15, but comprising a strap-like member that is doubled upon itself, the fold being open as at 22, so that an arm 19 can be inserted therein, if desired. This permits of still another adjustment since the arm can be secured either within the loop of the member 15ᵃ or against the front or rear surface thereof, as could also a bumper bar 21ᵃ (Fig. 11). Where the riser of Figs. 7 to 10 permits of four positions of adjustment, the riser of Fig. 6, by reason of the loop at 22, will permit of six positions of adjustment for an impact bar with respect to the vehicle frame.

I claim as my invention:—

1. A bracket member having one end portion adapted for attachment to a vehicle frame and another end portion adapted for flatwise connection to an impact bar, when disposed vertically, and the said portions being disposed in substantially parallel planes that are laterally offset.

2. A bracket member formed of flat bar stock whose end portions are disposed in transversely-spaced planes and merge with a transversely-extending intermediate portion, and means for connecting the end portions of said member to a bumper bar and a vehicle frame, respectively, that are vertically spaced.

3. A bracket member having one end portion adapted for attachment to a vehicle frame and another end portion adapted for connection to an impact bar, the said portions being disposed in substantially parallel planes that are laterally offset, the bracket member being reversible about its longitudinal axis.

4. A bracket member having one end portion adapted for attachment to a vehicle frame and another end portion adapted for connection to an impact bar, the said portions being disposed in substantially parallel planes that are laterally offset, and the front and rear surfaces of the second-named end portion being alternatively adapted for engagement with a member to be connected thereto.

5. A bracket member having one end portion adapted for attachment to a vehicle frame and another end portion adapted for connection to an impact bar, the said portions being disposed in substantially parallel planes that are laterally offset, and the front and rear surfaces of the first-named end portion being alternatively adapted for engagement with a supporting surface of a vehicle frame.

6. Bracket structure for connecting impact bars to vehicle frames, comprising a riser having a plurality of abutting surfaces disposed in planes spaced transversely of an impact member connected thereto, means for attaching said impact member to either of said surfaces, and means for attaching the riser to a vehicle frame.

7. Bracket structure for connecting impact bars to vehicle frames, comprising a riser having a plurality of abutting surfaces disposed in planes spaced transversely of an impact member connected thereto, means for attaching said riser to a frame, with either of said surfaces in abutting engagement therewith, and means for connecting an impact bar to another portion of said riser.

8. A bracket member having one end portion adapted for connection to an impact bar, another portion offset in a transverse direction relative to the first-named portion, and means for connecting the said bracket member to a frame at various points longitudinally of the bracket member and permitting attachment thereof to the bar at either of a plurality of points spaced transversely of the said member.

9. The combination with a bumper bar and a supporting frame, of a bracket member for connecting the bar to the frame, the said member having an offset portion, and means for mounting said member in operative position, with said offset portion extending in any one of a plurality of directions, the said offset occurring at a point intermediate the points at which the member is attached to the bumper bar and the frame, respectively.

In testimony whereof I, the said WILLIAM R. McGOWEN, have hereunto set my hand.

WILLIAM R. McGOWEN.